United States Patent
Kiesel et al.

(10) Patent No.: US 9,021,018 B2
(45) Date of Patent: Apr. 28, 2015

(54) METHOD AND SYSTEM FOR SUPPORTING THE SELECTION OF COMMUNICATION PEERS IN AN OVERLAY NETWORK

(75) Inventors: Sebastian Kiesel, Stuttgart (DE); Hans-Joerg Kolbe, Darmstadt (DE); Rolf Winter, Heidelberg (DE)

(73) Assignee: NEC Europe Ltd., Heidelberg (DE)

( * ) Notice: Subject to any disclaimer, the term of this patent is extended or adjusted under 35 U.S.C. 154(b) by 197 days.

(21) Appl. No.: 13/505,033

(22) PCT Filed: Oct. 29, 2010

(86) PCT No.: PCT/EP2010/006611
§ 371 (c)(1),
(2), (4) Date: Apr. 30, 2012

(87) PCT Pub. No.: WO2011/050966
PCT Pub. Date: May 5, 2011

(65) Prior Publication Data
US 2012/0215850 A1    Aug. 23, 2012

(30) Foreign Application Priority Data
Oct. 30, 2009    (EP) .................................... 09013667

(51) Int. Cl.
*G06F 15/16* (2006.01)
*G06F 15/167* (2006.01)
(Continued)

(52) U.S. Cl.
CPC ........ *H04L 67/104* (2013.01); *H04L 29/08144* (2013.01); *G06F 17/30* (2013.01); *H04L 29/08306* (2013.01); *H04L 67/1063* (2013.01); *H04L 67/1072* (2013.01)

(58) Field of Classification Search
CPC ................................................. H04L 29/08306

USPC ........ 714/748, 749; 455/456.1; 709/201–203, 709/217–219, 229, 249
See application file for complete search history.

(56) References Cited

U.S. PATENT DOCUMENTS 5,442,633 A * 8/1995 Perkins et al. ................. 370/331
6,735,202 B1 * 5/2004 Ahmed et al. ................. 370/392
(Continued)

FOREIGN PATENT DOCUMENTS

EP    2086206      * 5/2009    .............. H04L 29/08
JP    2002007347 A    1/2002
(Continued)

OTHER PUBLICATIONS

International Search Report dated Jan. 14, 2011, corresponding to PCT/EP2010/006611.

*Primary Examiner* — Aftab Nasir Khan
(74) *Attorney, Agent, or Firm* — Young & Thompson (57) ABSTRACT

A method for supporting the selection of communication peers in an overlay network, wherein a multitude of communication peers participate in the overlay network by providing certain pieces of information, and wherein at least one peer-to-peer server—tracker—is provided that maintains a database of the participating communication peers and the information possessed by them, wherein the tracker, upon receiving a query regarding a specific piece of information from a communication peer—requesting client—, answers the query by providing the requesting client a list that includes a subset of all communication peers possessing the requested piece of information, includes providing a network entity located such that it receives messages directed from the requesting client to the tracker, wherein the network entity stamps topological location information of the requesting client into any of the messages directed from the requesting client to the tracker. Furthermore, a corresponding system is disclosed.

24 Claims, 5 Drawing Sheets

IP packet with location information (51) Int. Cl.
*H04L 29/08* (2006.01)
*G06F 17/30* (2006.01)

(56) References Cited

U.S. PATENT DOCUMENTS

| | | | |
|---|---|---|---|
| 2002/0143918 A1* | 10/2002 | Soles et al. | 709/223 |
| 2003/0145066 A1 | 7/2003 | Okada et al. | |
| 2004/0081093 A1* | 4/2004 | Haddock et al. | 370/230 |
| 2004/0254977 A1* | 12/2004 | Zhang | 709/201 |
| 2005/0188004 A1* | 8/2005 | Bergenwall et al. | 709/203 |
| 2006/0245435 A1* | 11/2006 | Sajassi | 370/395.53 |
| 2006/0271700 A1 | 11/2006 | Kawai et al. | |
| 2008/0109446 A1* | 5/2008 | Wang | 707/10 |
| 2008/0177970 A1* | 7/2008 | Prahlad et al. | 711/170 |
| 2010/0146078 A1* | 6/2010 | Wolff et al. | 709/219 |
| 2010/0229064 A1* | 9/2010 | Omeni | 714/749 |
| 2011/0270924 A1* | 11/2011 | Johnsson et al. | 709/204 |
| 2011/0282945 A1* | 11/2011 | Thyni et al. | 709/204 |

FOREIGN PATENT DOCUMENTS

| | | |
|---|---|---|
| JP | 2003223378 A | 8/2003 |
| JP | 2006332825 A | 12/2006 |
| JP | 2008071139 A | 3/2008 |
| WO | 01/99344 | 12/2001 |
| WO | 02/078285 | 10/2002 |
| WO | 2008/017506 | 2/2008 |
| WO | 2009125760 A1 | 10/2009 |

* cited by examiner

METHOD AND SYSTEM FOR SUPPORTING THE SELECTION OF COMMUNICATION PEERS IN AN OVERLAY NETWORK

The present invention relates to a method for supporting the selection of communication peers in an overlay network, wherein a multitude of communication peers participate in said overlay network by providing certain pieces of information, and wherein at least one peer-to-peer server—tracker—is provided that maintains a database of said participating communication peers and the information possessed by them, wherein said tracker, upon receiving a query regarding a specific piece of information from a communication peer—requesting client—, answers said query by providing said requesting client a list that includes a subset of all communication peers possessing said requested piece of information.

Furthermore, the present invention relates to a system for supporting the selection of communication peers in an overlay network, including a multitude of communication peers that participate in said overlay network by providing certain pieces of information and at least one peer-to-peer server—tracker—that maintains a database of said participating communication peers and the information possessed by them, wherein said tracker is being configured, upon receiving a query regarding a specific piece of information from a communication peer—requesting client—, to answer said query by providing said requesting client a list that includes a subset of all communication peers possessing said requested piece of information.

Overlay network-based applications, in particular peer-to-peer (P2P) file sharing applications, cause a significant share of the overall Internet traffic. According to current Internet traffic studies, e.g. formed by Ipoque (www.ipoque.com), the popular BitTorrent file sharing application alone creates a significant amount of traffic, in some deployments reaching a fraction of more than 50% of the overall traffic in ISP (Internet Service Provider) networks. It comes therefore as no surprise that many operators are unhappy about P2P applications as they not only cause tremendous amounts of traffic, but also because this traffic travels uncontrollably over links that are expensive for the operator, although the very nature of these applications would have allowed them to choose a communication peer that would have been preferred by the operator, e.g. a peer in its own network.

Therefore, a number of applications and application-layer networks such as P2P overlay networks (e.g. BitTorrent) try to optimize their choice of communication peer. That means that when an application is presented with a choice of possible communication peers it attempts to choose the optimal one or a set of optimal ones in order to maximize performance. The metric to choose a peer could be e.g. the round trip time. The problem with this approach is twofold: A) an application has to measure the values to optimize and can only arrive at the optimum after a certain amount of time and after all candidate peers have been probed and B) an application's notion of optimality is often in stark contrast to an operator's notion of optimality which has led to a number of incidents where operators punish these applications by rate limiting or other means. An operator is e.g. usually interested in keeping traffic inside its own network or on low cost links to other operators which would require a location-based optimization function (location as in network topological location).

The mentioned kind of optimization is non-trivial as e.g. relying on the IP address is insufficient inside an operator network. Moreover, relying on geographic coordinates can be misleading as geographic proximity does not need to translate to proximity in the network topology etc. In order to solve this problem to the satisfaction of both parties—applications/users and the network operators—the overall optimization problem needs to be addressed jointly. ALTO (see for reference http://www.ietf.org/dyn/wg/charter/alto-charter.html) and P4P (see for reference http://www.dcia.info/documents/P4P_Overview.pdf) are two approaches that attempt to solve this optimization problem but suffer from the fact that one party has to reveal information to the other party and the infrastructure for the service (usually a server) is provided by the operator.

Respecting an operator's preferences to a certain degree when allowing an application or application-layer network to choose good peers from a list of candidate peers is particularly critical due to the fact that there is a certain amount of distrust between those two parties and a number of security concerns play a vital role such as user privacy and keeping business relationships between operators hidden. But the general problem has resulted in a number of efforts that try to address this issue. While in theory these efforts can solve the technical optimization problem they fail to address the trust, security and privacy issues adequately, mostly because an application or peer in an overlay network needs to either query a service provided by the network operator to select peers for it (privacy issue) or that same service needs to reveal topological properties that can reveal more than the operator is usually willing to reveal.

Furthermore, in the Internet, there is a large number of trackers installed. Not all of them are operated by trustworthy parties, e.g., "The Pirate Bay" operates BitTorrent trackers for indexing swarms that are mainly used for the redistribution of copyrighted materials. This implies that any optimization method must be able to support multiple trackers and must take into account the confidentiality/privacy needs of network operators and users.

It is therefore an object of the present invention to improve and further develop a method and a system of the initially described type for supporting selection of communication peers in an overlay network in a way that allows for an efficient and reliable selection of optimal candidate communication peers, thereby coping with the interests of the operator on the one hand and of the user/application on the other hand as far as possible.

In accordance with the invention, the aforementioned object is accomplished by a method comprising the features of claim 1. According to this claim, such a method is characterized in that a network entity is provided being located such that it receives messages directed from said requesting client to said tracker, wherein said network entity stamps topological location information of said requesting client into any of said messages directed from said requesting client to said tracker.

Furthermore, the aforementioned object is accomplished by a system comprising the features of claim 18. According to this claim, such a system is characterized in that the system further includes a network entity being located such that it receives messages directed from said requesting client to said tracker, wherein said network entity includes a location information insertion module that is configured to stamp topological location information of said requesting client into any of said messages directed from said requesting client to said tracker.

According to the invention it has been recognized that the above mentioned object can be achieved by involving an additional network entity, preferably in the form of operator equipment in the requesting client's access network, which inserts topological location information of the requesting client into messages that are directed to the tracker. Consequently, according to the present invention a generic mechanism is provided that allows operators to assist optimization, while being agnostic to content routing and communication peer selection. In other words, the requesting client does not have to reveal specific information to its network operator and vice versa.

The method and the system according to the present invention can operate with the consent of all parties involved. In particular, if the stamping network entity belongs to the requesting client's operator, it does not require the operator to reveal information to the participating peers and the operator can decide based on policies which information to reveal. On the other hand it does not require the user to reveal information to the operator; in fact, the user explicitly asks ISP to publish information about him to a specific tracker. As a result, the method and the system according to the present invention provides controlled, trusted disclosure of network-topology related information, which can be used to optimize the performance and resource consumption of overlay networks, such as peer-to-peer file sharing applications. It provides better scalability and accuracy (operator information vs. coarse-grained IP-level information) and less legal implications as with related proposals (e.g. IETF ALTO where e.g. the peer might be forced to reveal all candidates to the operator).

Furthermore, according to the invention updates of location information are targeted, since they are made only to servers that need to know it and only when they really need to know it. More specifically, the present invention allows making targeted just-in time updates (e.g. only to a specific tracker for a particular file at the time the peer joins the overlay network) including topological information provided by the operator without revealing the candidate set of peers to the operator. That means that no unnecessary updates of location information are performed and these updates are only done, when really necessary, i.e. when becoming a part of an application-layer network or when starting the application.

A further advantage of the present invention results from the fact that it is a de-centralized solution that does not require a central server for providing topology information. Moreover, although all parties involved—e.g. user, ISP, and tracker—need to support the procedures to work, it is modular for each party, i.e. the ISP does not need to be content-aware.

It is important to note that the present invention is based on topological, not physical location information. For example, if two peers are located in the same building but are connected to different Internet Service Providers (ISP) the topological distance may be larger than the distance between two peers connected to the same ISP but located in different cities. Therefore, the location information that should be known to the tracker may include geographical location (e.g., country code, city code), but more important is information related to the network topology.

As already mentioned, the required topology information cannot be retrieved by simply comparing IP addresses. While in corporate and university campus networks the IP addresses are assigned in a way that to some extent reflects the network topology, this is not true for typical residential user broadband access networks. Here, the IP addresses are assigned temporarily from a large address pool. Therefore, if two peers have a "similar" IP address (i.e., the numerical difference between them is small), one cannot conclude that they are topologically close. Furthermore, the mapping of IP addresses to clients and locations changes frequently. Therefore, a static mapping table will not be sufficient.

According to a preferred embodiment the subset of communication peers the tracker includes into the list that he returns to the requesting client includes those communication peers that are topologically located closest to the requesting client. The tracker may thus craft its answer not by randomly selecting a subset of communication peers, but by using a peer selection module that works on the basis of the knowledge the tracker has gained about the (relative) topological locations of the communication peers. Using this information the tracker recommends communication peers that are close to the requesting client, thereby making the system more efficient, since topological proximity will often result in better-than-random connections, regarding performance and efficiency.

With respect to an effective and reliable generation of an optimal subset of communication peers that possess the requested piece of information, it may be provided that the tracker applies an optimization strategy which makes use of the topological location information available at the tracker. Basically, a multidimensional ordering relation may be used to determine which candidate communication peers are closer to the requesting client than others are. This strategy will most likely be universal, i.e. a strategy applied to all participating communication peers.

Advantageously, the topological location information included by the network entity into a message sent from the requesting client to the tracker includes the identification of the requesting client's Internet Service Provider, its Autonomous System Number, its main distribution frame ID, its DSLAM/MSAN (Digital Subscriber Line Access Multiplexer/Multi-Service Access Node) and/or its line ID (e.g., Agent Circiut ID, remote ID as defined in RFC 3046/BBF TR-101, etc.). In addition, even port and line card positions that can become relevant to avoid layer-1 issues when generating traffic like crosstalk in the xDSL case may be included. As will be explained below, it strongly depends on the specific network entity that stamps the message and on its functional and topological characteristics to which extent topological location information of a requesting client is actually disclosed to this entity, and to which extent available information is stamped into a message. In this regard it is important to bear in mind that none of the information listed above is usually disclosed to a user.

According to a preferred embodiment at least one message sent from a requesting client to the tracker is configured to include a location field that is being marked as empty or invalid. As most Internet users do not know their exact topological location (e.g., to which switching office they are connected), it is assumed that a requesting client will generally not be able to include valid location information into messages it sends to a tracker. However, advantageously the requesting client generates its messages in such a way that there is enough space in the message, which can be overwritten later with valid location information. This space—the location field—should be marked as "empty" or "invalid", e.g., by setting it to all zeroes.

In a next step it may be provided that a network entity, upon detecting a message of a requesting client including a location field marked as empty or invalid, stamps that message by overwriting the (incorrect) content of the location field with valid topological location information of the requesting client. It is to be noted that even in case there is no network entity on the entire path of a message from the requesting to the tracker that stamps in valid topological location information of the requesting client, this will not result in a dysfunctional overall system but only in an un-optimized one for both users and operators.

A user could initialize the location field not to "invalid" as expected, but instead fill in syntactically valid topological location data, which does not reflect his/her true location, i.e. he/she would be lying. Generally, according to the invention it is expected that a network entity on the path of the messages sent from a requesting client to a tracker should overwrite the information contained in the location field. However, if there is no such network entity on the path that supports this operation, the untrusted information would reach the tracker. Therefore, according to a preferred embodiment each network entity that stamps a message digitally signs and/or encrypts the information it inserts, for the tracker to distinguish between data provided by e.g. the network operator or the user.

Basically, it may be provided that nodes in the signaling path of messages sent from a requesting client to a tracker append location information to the messages. By this means, messages can become enriched with e.g., stacked hierarchical location information. The inserted topological location information can also include physical media information, which is of particular relevance with respect to messages that include location information regarding the "access line type" used by the requesting client. A possible use case is a P2P network that preferably chooses customers with optical access line to provide content since those with electrical access lines (xDSL) can possibly cause trouble with crosstalk with other access lines when making excessive use of the bandwidth.

According to another particularly preferred embodiment the network entity is operated by the requesting client's Internet Service Provider, since the operator is generally aware of relevant topological location information of its customers. Based on configurable policies the requesting client's Internet Service Provider may decide which topological location information of a requesting client to include into messages directed to the tracker, i.e. the operator is in control of which of these parameters to reveal. The more the operator reveals to applications, the higher is the optimization potential for both, him and his customers. However, there will be no information flow from the overlay network to the operator/ISP or from the operator/ISP to the overlay network if the operator does not wish to reveal location information.

Advantageously, the network entity that stamps the message is the first IP-aware device in the requesting client's access network since this device typically has the most complete knowledge of a client's topological information. In particular, the network entity may be an MSAN (Multi-Service Access Node), a BRAS (Broadband Remote Access Server), a router or an L2/L3 access node. Nonetheless it may be provided that network entities further upstream analyze messages in order to detect whether the messages have been stamped with valid location information already or whether the messages still include a location field marked as empty or invalid. In the latter case such network entities located further upstream may make up for the stamping by including location information into the messages. Generally, this information will be less complete due to the larger topological distance to the requesting client.

Advantageously, messages that have been stamped with topological location information of a requesting client are transmitted to the tracker by means of normal IP forwarding procedures, i.e. with respect to forwarding the message through the network the same mechanisms can be applied as in case of "normal" messages.

In a next step it may be provided that a tracker, upon receiving a message including topological location information of a requesting client, extracts the topological location information by means of a location information retrieval module and stores it in a local database for a configurable length of time. The time period after which the tracker deletes the information may be of constant length or may be dynamically updated, e.g. depending on the frequency of changes in the number and/or structure of the participating communication peers. In case no network entity on the messages' path has stamped the location field with topological location information of the requesting client, the tracker may simply ignore the location field.

With respect to high reliability performance, it may be provided that the tracker acknowledges receipt of messages containing topological location information of a requesting client. Furthermore, it may be provided that a network entity retransmits the topological location information of a requesting client in case it does not receive an acknowledgement from the tracker within a configurable period of time.

According to still another preferred embodiment the tracker includes a service selection module that is configured to receive the topological location information of a requesting client and to determine which service that client/user is allowed to access. An example is to determine the set of TV programs users are allowed to watch in specific geographical region, as e.g. implemented by Zattoo based on countries using static lists of IP addresses. Depending on the kind of network entity that stamps a message from a requesting client with topological location information such service access decision can be made on a much more granular basis than in prior art systems, e.g. based on cities, not countries, since the accuracy of the available topological location information will typically be rather high. The service selection module could also just work in a way that it just recommends channels based on the location information. Other application-layer networks that could benefit are e.g. content distribution networks (CDNs), that now have much finer-grained location information available than IP address-based information.

There are several ways how to design and further develop the teaching of the present invention in an advantageous way. To this end it is to be referred to the patent claims subordinate to patent claims 1 and 18 on the one hand and to the following explanation of a preferred embodiment of the invention by way of example, illustrated by the figure on the other hand. In connection with the explanation of the preferred embodiment of the invention by the aid of the figure, generally preferred embodiments and further developments of the teaching will we explained. In the drawing

Although the present invention is applicable in a much broader scope, the following description of preferred embodiments explains the method and the system according to the present invention using an example of optimizing a BitTorrent-like application. Consequently, although the following description will make use of BitTorrent terms, it is not limited in any way to this specific P2P protocol. Any kind of application can benefit from the present invention.

Figure 1:
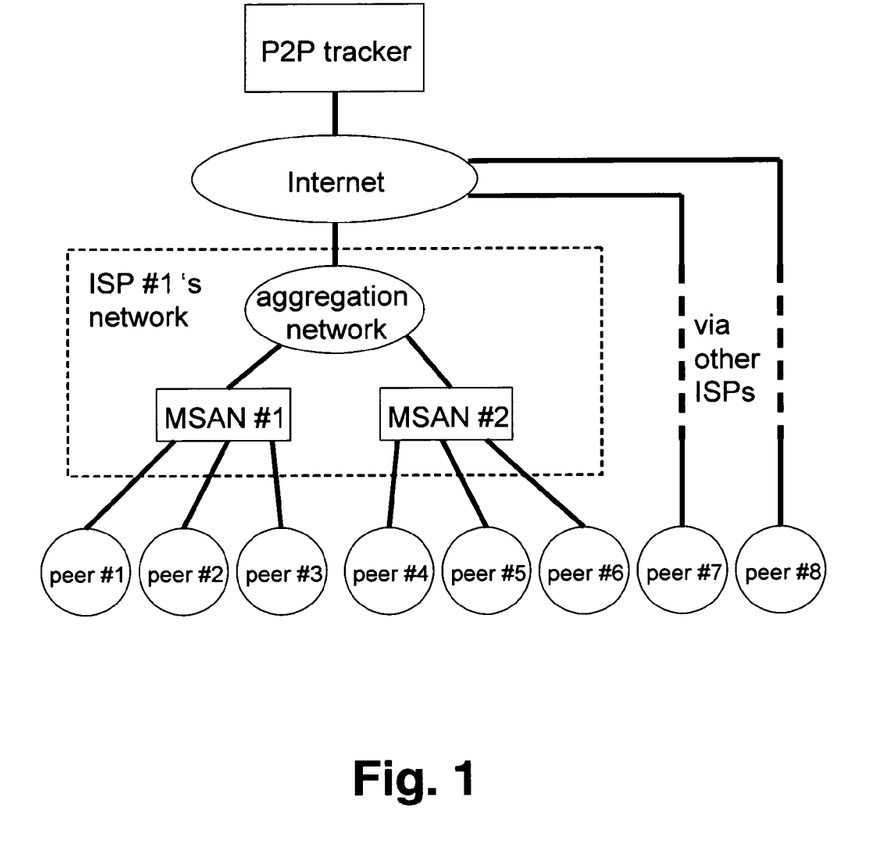
FIG. 1 is a schematic view generally illustrating a network topology with a peer-to-peer application according to prior art.

FIG. 1 shows the basic principle of operation for a tracker-based peer-to-peer file sharing application, such as BitTorrent. The illustrated system includes a plurality of communication peers—peer #1-peer #8—that participate by providing certain pieces of information. In real world scenarios, of course, the number of participating peers will typically be much higher and may include hundreds and even thousands of peers. Peers #1-6 are customers of Internet Service Provider ISP #1, whereas peer #7 and peer #8 belong to other ISPs. The network of ISP #1 includes an aggregation network towards the Internet to which peers #1-3 are connected via Multi-Service Access Node MSAN #1 and peers #4-6 via MSAN #2. Furthermore, the system includes a so called tracker, which is a P2P server that maintains a database of all participating communication peers and the pieces of information possessed by them. As mentioned already above, for popular content, this list may consist of thousands to hundred thousands of peers.

According to prior art approaches, the basic principle of operation for such a tracker-based P2P file sharing system is as follows:
1. A peer—in the following referred to as requesting client—that wants to retrieve a particular piece of information (e.g., a file) sends a content identifier to the so-called tracker.
2. The tracker answers to the requesting client with a list, which contains some tens of IP addresses of peers that possess the desired content. That is, in order to keep the size of the answer small, the tracker does not return all known peers but a subset, which is usually picked at random.
3. The requesting client establishes data connections to one or several of the addresses learned from the tracker and starts accessing the desired content.

Figure 2:
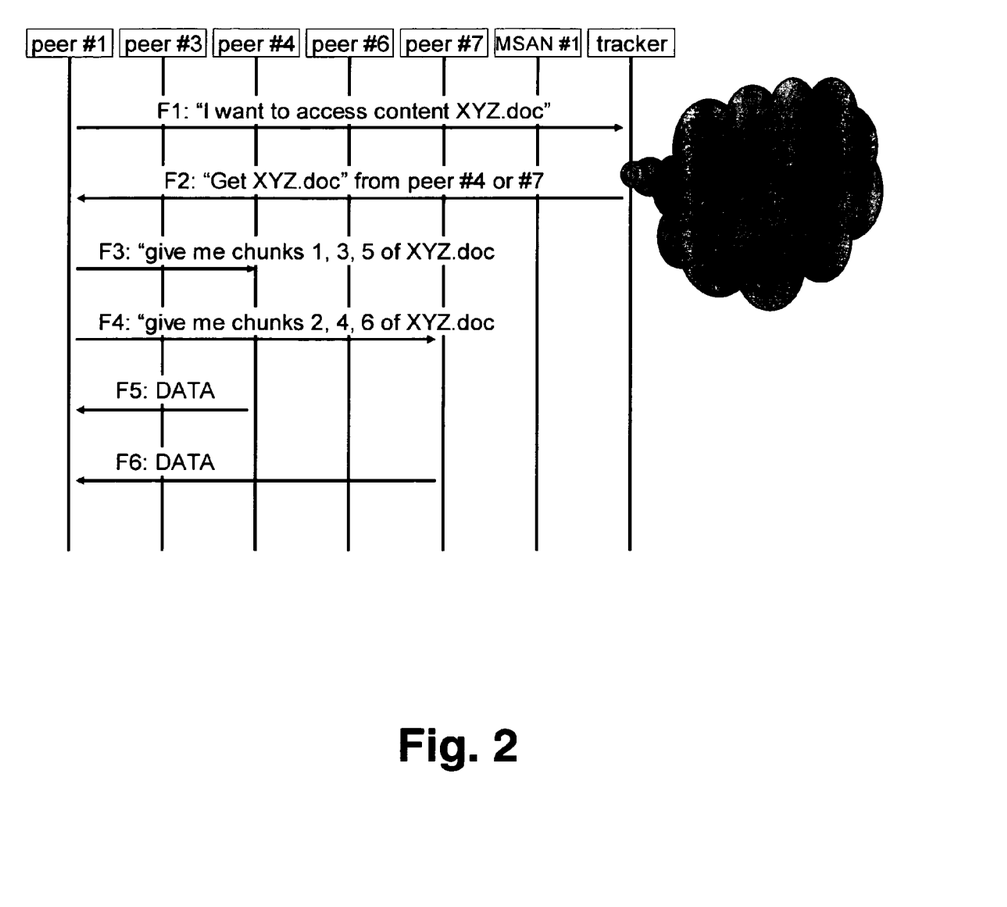
FIG. 2 is a schematic view illustrating a message sequence chart of a prior art application scenario in the network topology of FIG. 1.

The same prior art operation principle is illustrated in FIG. 2 in form of a message sequence chart including the messages F1-F6. As can be obtained from FIG. 2 the tracker selects randomly peers #4 and #7 (from peers #3, 4, 6, and 7 that are assumed to be able to provided the piece of information requested from the requesting client). By message F2 the requesting client is informed accordingly. In the embodiment of FIG. 2 the requested piece of information is assumed to consist of single chunks. The requesting client does not necessarily have to request all chunks from a single peer contained in the list that it received from the tracker. In FIG. 2, the requesting entity queries peer #4 to provide chunks 1, 3, and 5 of the requested piece of information and peer #7 to provide chunks 2, 4, 6 of the information. By splitting up the request the download of the information can be significantly accelerated.

Depending on the topological locations of the two peers in such a data connection, the achievable performance and resource consumption may vary. State-of-the-art peer-to-peer software optimizes the virtual topology based on measurements between the peers, i.e., if the measured throughput from/to another peer is not adequate, the connection is terminated and the tracker is asked for other peers that can be given a try instead. However, this approach relies on time-consuming measurements and needs time to let the overlay topology converge to a close-to-optimal state. This can be a problem, in particular if peers join and leave the overlay frequently (e.g., if user is switching channels in a peer-to-peer TV streaming application).

Figure 3:
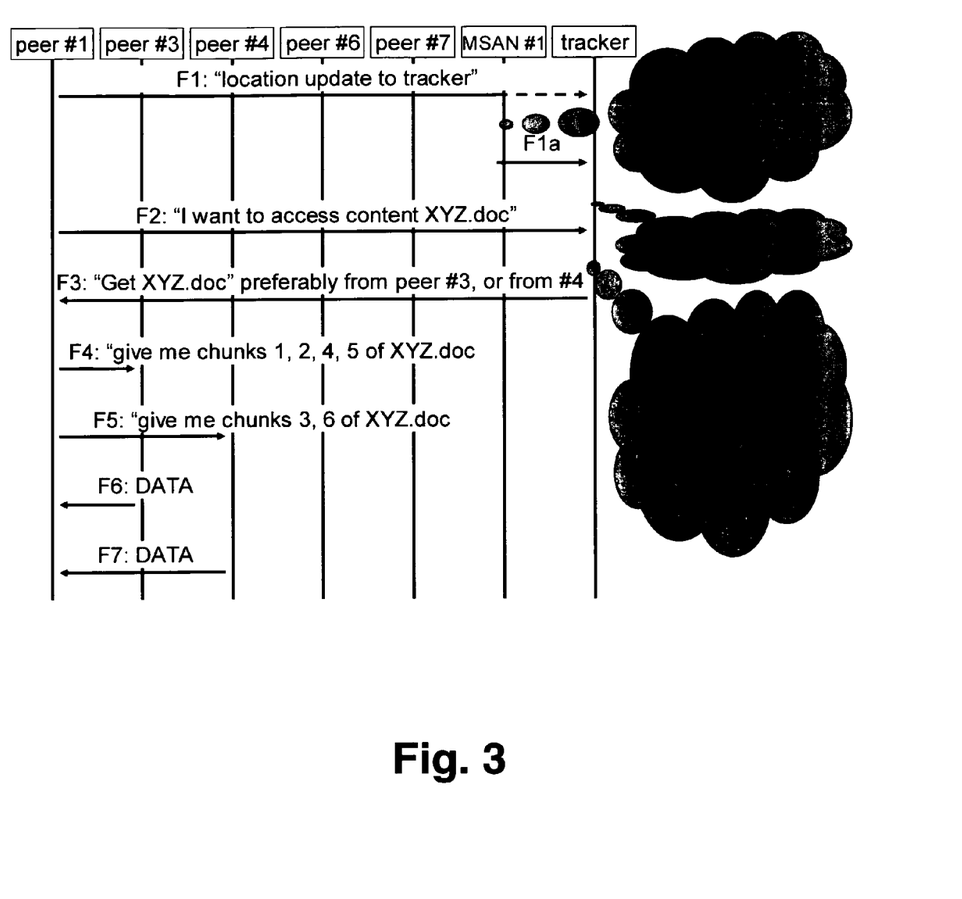
FIG. 3 is a schematic view illustrating a message sequence chart according to an embodiment of the present invention in the network topology of FIG. 1.

FIG. 3 is a schematic view of a message sequence chart according to an embodiment of the present invention. The underlying network topology is the same as in FIG. 2. In this example the specific procedures according to the present invention are performed shortly before the normal message exchange between peer and tracker as described above in connection with FIG. 2.

A new peer—peer #1 in FIG. 2—, which has not been exchanging messages with the tracker for a while (or never), sends an update (F1) indicating its topological location to the tracker. As most Internet users do not know their exact topological location (e.g., to which switching office they are connected), it is assumed that this message does not contain valid location information at this stage. However, there must be enough space in the message, which can be overwritten later with valid location information. This space should be marked as "empty" or invalid, e.g., by setting it to all zeroes. The purpose of this message is that the user (or more precisely his P2P software) instructs the ISP to disclose the user's location to a particular tracker (identified by the destination IP address of the message).

The first IP-aware device at the provider's network, which is MSAN #1 in FIG. 2, detects the message. It "stamps" the message (thereby generating message F1a), i.e., the empty space as defined above is overwritten with valid location information (e.g., ISP ID, AS Number, MSAN ID, port ID, etc.) as depicted by the example given in FIG. 4. It is also possible that location information is stamped into packets that are already part of the P2P signaling procedure (i.e. not only for this specific purpose) if the signaling messages allow it.

Figure 4:
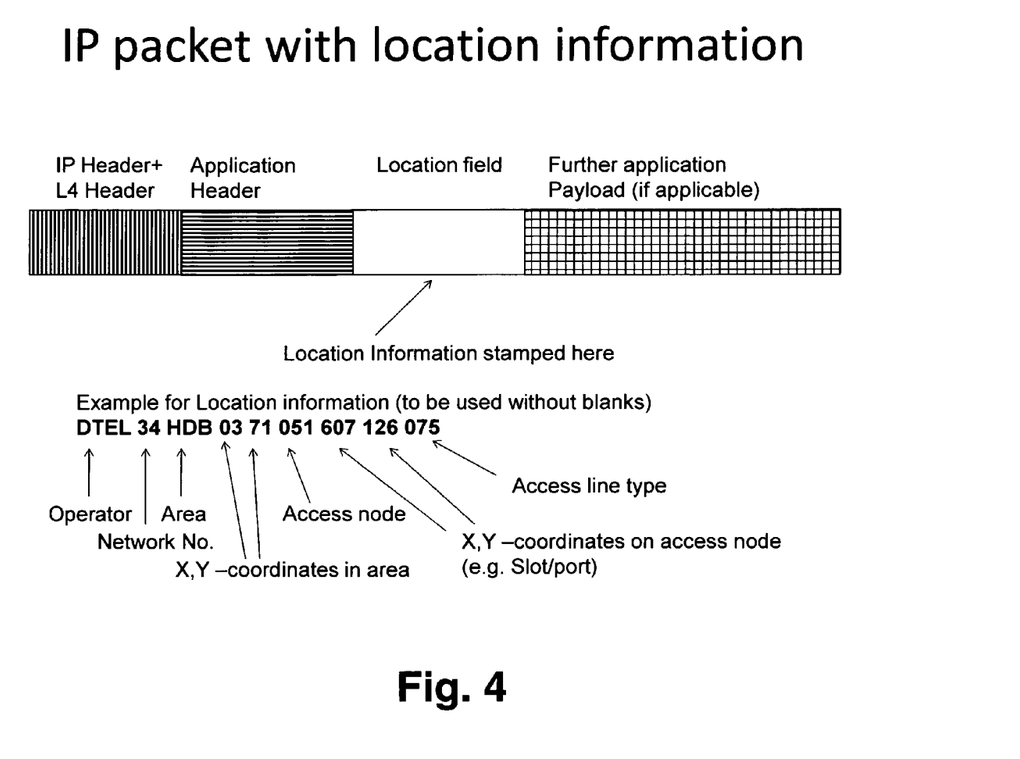
FIG. 4 is a schematic view illustrating an IP packet with application and location data as employed in an embodiment of the present invention.

FIG. 4 illustrates the configuration of a typical message sent from a requesting client to a tracker as employed in connection with the present invention. The message includes a first header, which contains an IP Header and an L4 Header (vertical lines), a second header, which is an Application Header (horizontal lines), a location field (white), the details of which are explained below, and a field (plaid) for further applications and/or payload.

The example of FIG. 4 covers the case where location information is stamped into regular application signaling. In case of dedicated messages towards the application with the single purpose to reveal the location, the application header shown is not needed. Whether in the use cases where location information is stamped into "regular" signaling messages a fixed position inside the packets is reserved or not is up to later standardization agreements and can depend on the applications. Network elements can implement this stamping function based on pre-defined rules similar to current procedures when re-writing IP header fields based on criteria defined using access control lists. Assigning e.g., dedicated port numbers for specific frame formats is a desirable goal for standardization since it would lower the requirements for the packet inspection function in the network nodes.

The example shown in FIG. 4 includes the insertion of topological location information of the requesting client related to the operator, the network number, the area, the x,y-coordinates within the area, the access node, and the x,y-coordinates on the access node (e.g. slot and/or port). Furthermore, topological location information related to the access line type is inserted, which may be useful in cases where customers with optical access line are to be preferred over customers with electrical access lines (xDSL) only. The format of the location information can be based e.g. on TLVs (type length values).

Returning now to FIG. 3, the stamped message (F1a) is forwarded through the network, using normal procedures of IP forwarding, to the tracker. The tracker can extract the location information and store it in a local database for a reasonable amount of time. If the tracker is asked by the new peer about other peers that possess a specific piece of information (message F2), it can create the answer not by randomly selecting some peers, but by recommending peers that are close to the requester (message F3). This assumes that not only the querying peer #1 has disclosed its location to the tracker, using the method described here, but also the other peers have done it in the past, using the same method. However, not having location information conveyed does not result in a dysfunctional overall system but in an un-optimized one for both users and operators.

Based on the response from the tracker, the requesting peer can start downloading the content from the peers indicated by the tracker (messages F4-F7), presumably getting better results and using fewer resources in the network than with un-optimized, random peer selection.

Figure 5:
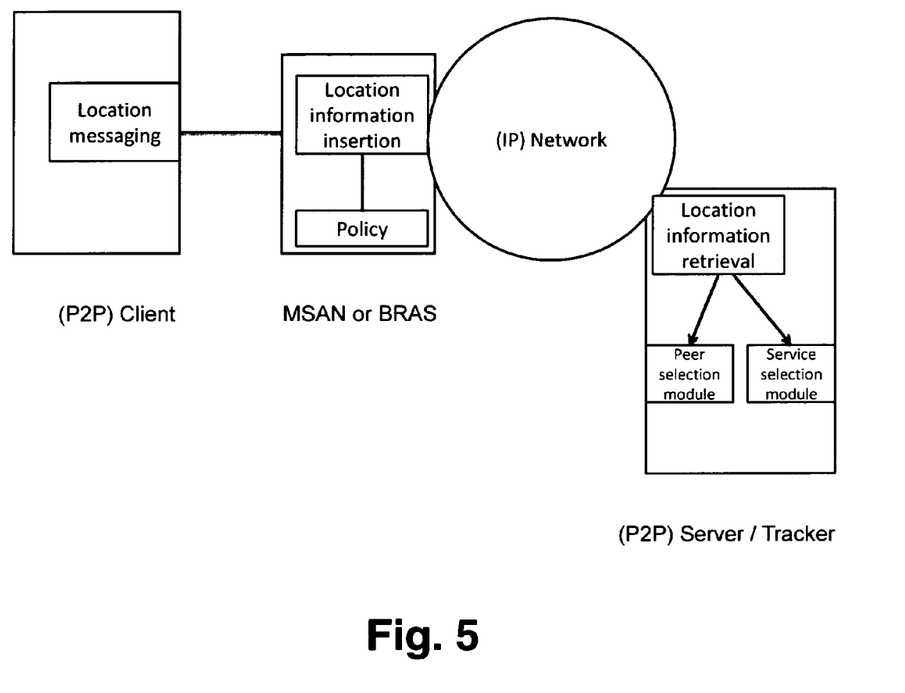
FIG. 5 is a schematic view illustrating a functional model of the modules employed according to an embodiment of the present invention.

FIG. 5 is a schematic view illustrating a functional model of the modules employed according to an embodiment of the present invention. The requesting (P2P) client includes a location messaging module that generates signaling messages that usually do not contain (valid) location/topology information, but which have a format that includes a location field of sufficient size for detailed topological location information to be inserted, i.e. to be stamped in by upstream devices, in particular by an MSAN or BRAS or Access Node of the requesting client's operator. If the customer is connected to a MSAN/BRAS/Access Node that does not support the stamping method described here, another node further upstream in the access network (e.g. any kind of L2 and/or L3 aware access node located in the signaling path of message flows) may detect that the "empty space" is still empty and stamp-in less detailed location information of the customer/requesting client. In any case, the stamping network entity will be equipped with a location information insertion module that stamps location information into the appropriate places in the packet.

In the tracker/(P2P) server, the location information is retrieved by means of a location information retrieval module, which is configured to inject the information either into a peer selection module or into a service selection module, or into both. The peer selection module calculates the peers that can serve (future) requests by that client best, based on metrics imposed upon this information. When the information is passed on to the service selection module, this module determines which service(s) a user is allowed to access. An example is to determine the set of TV programs users are allowed to watch in specific geographical region, as e.g. implemented by Zattoo based on countries using static lists of IP addresses. This invention allows for a much more granular decision, e.g. based on cities, not countries.

For some applications it would be beneficial if a P2P node could find out its own topological location (instead of having the location information disclosed to third parties such as trackers). In order to achieve this, the invention allows the peer to send a location update message to a special "reserved" IP or L2 address which is not assigned to a tracker. If the MSAN/BRAS/AN detects this kind of message, it can insert the location information and send it back to the originator. Applications like emergency service location methods as e.g. summarized in ETSI TS 102 650 can benefit from this feature.

Finally, it is to be noted that there are many ways for technically solving the basic problem of disclosing the topological location of a peer to another party in the Internet. However, the solution also has to consider lots of legal implications. Each of the alternatives has specific disadvantages compared to the present invention:

1. One can prompt the user for his location in the P2P software and convey the location inside the P2P protocol. The main problem is that many users don't know their topological location (e.g., to which switching office and DSLAM/MSAN they are connected to).

2. The topology can be inferred from measurements between the peers. This is time-consuming and may be inaccurate. Furthermore, one can only measure performance-related parameters, but not the monetary cost that occur to ISPs when carrying the traffic.

3. The network operators can publish "network topology maps" (see IETF ALTO), but they are rather reluctant to do so, as this would disclose the overall network topology (not only information about the users that actually use P2P) to the tracker operators.

4. The tracker operators could delegate the topology-aware peer selection to the network operators, by sending lists of candidate peer addresses to the ISP, for having them sorted. However, tracker operators are reluctant to disclose information about who is participating in a P2P swarm to ISPs, and ISPs are reluctant to offer this service, as content owners and legislature could force them to protocol copyright infringing activities of their customers.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for supporting a selection of communication peers in an overlay network, the method including:
    a plurality of communication peers participating in said overlay network by providing certain pieces of information, a first of said communication peers being a requesting client located on an access network of a first Internet Service Provider; and
    at least one peer-to-peer server operating as a peer-to-peer tracker maintaining a database of said participating communication peers and information possessed by said participating communication peers,
    said requesting client sending a query regarding a specific piece of information to said tracker,
    said tracker consisting of a retrieval module, a peer selection module, and a service selection module, wherein the peer selection module calculates the peers that best serve future requests based on metrics, and the service selection module receives topological location information of said requesting client and determines which service that said client is allowed to access,
    said tracker, upon receiving said query regarding the specific piece of information from the requesting client, answering said query by extracting the topological location information using retrieval module and storing the topological location information in the database for a configurable length of time, and by providing said requesting client a list that includes a subset of all said communication peers possessing said requested piece of information, wherein said tracker deletes the topological location information based on a frequency of changes in a number of or structure of the participating communication peers,
    a network entity receiving a message from said requesting client directed to said tracker, said message having a location field with a content, and said network entity detecting whether the content of the location field of said message is marked as one of the group consisting of empty or invalid, and upon detecting that the location field is marked as empty or invalid, the network entity stamps said message by overwriting the content of said location field with valid topological location information of said requesting client, and forwarding said message, with the stamped valid topological location information, to said tracker, wherein said valid topological location information includes at least one of an identification of the requesting client's Internet Service Provider, the requesting client's Autonomous System Number, the requesting client's main distribution frame ID, the requesting client's Digital Subscriber Line Access Multiplexer/Multi-Service Access Node, and x,y-coordinates of the requesting client within an area and the requesting client's line ID.

2. The method according to claim 1, wherein said topological location information includes each of an identification of the requesting client's Internet Service Provider, the requesting client's Autonomous System Number, the requesting client's main distribution frame ID, the requesting client's Digital Subscriber Line Access Multiplexer/Multi-Service Access Node and the requesting client's line ID.

3. The method according to claim 1, wherein the content of the location field of at least one message sent from said requesting client to said tracker is marked as either of empty or invalid, and the network entity is on the access network of the first Internet Service Provider, said message being a location update message.

4. The method according to claim 1, wherein said network entity digitally signs or encrypts the inserted topological location information.

5. The method according to claim 1, wherein the inserted topological location information includes physical media information.

6. The method according to claim 1, wherein said network entity is operated by said first Internet Service Provider.

7. The method according to claim 1, wherein said requesting client's Internet Service Provider, based on configurable policies, decides which topological location information of said requesting client to include into the content of the location field of said message directed to said tracker.

8. The method according to claim 1, wherein said network entity is a first IP-aware device in the access network encountered by said message.

9. The method according to claim 1,
wherein initial network entities forward said messages to further network entities further upstream for further forwarding to said tracker, and
wherein said further network entities analyze said message in order to detect whether i) the content of the location field of said message is marked as either empty or invalid, and upon detecting that the location field is marked as empty or invalid, the further network entities stamps said message by overwriting the content of said location field with valid topological location information, and ii) forwarding said message, with the stamped valid topological location information, to said tracker.

10. The method according to claim 1, wherein said network entity transmits said message including the stamped topological location information of the requesting client to said tracker using IP forwarding procedures.

11. The method according to claim 1, wherein said tracker, upon receiving said message including the topological location information of said requesting client, extracts said topological location information and stores said topological location in a local database for a configurable length of time.

12. The method according to claim 1, wherein said tracker ignores the location field of a message from a requesting client when no network entity on said message's path has stamped said location field with topological location information of said requesting client.

13. The method according to claim 1, wherein the subset of said communication peers included by said tracker into said list includes those communication peers that are topologically located closest to said requesting client, said tracker making a determination of the communication peers that are topologically located closest to said requesting client based on said stamped topological location information extracted from said message.

14. The method according to claim 13, wherein said tracker, using said stamped topological location information extracted from said message, applies a multidimensional ordering relation in order to determine which of said participating communication peers are topologically closer to said requesting client than others of said participating communication peers.

15. The method according to claim 1, wherein said tracker acknowledges receipt of said topological location information of said requesting client by sending an acknowledgement to said network entity.

16. The method according to claim 15, wherein said network entity retransmits the topological location information of said requesting client when said network entity does not receive the acknowledgement from said tracker within a configurable period of time.

17. A system for supporting the selection of communication peers in an overlay network, comprising:
a peer-to-peer server that operates as a peer-to-peer tracker;
a plurality of communication peers connected to each other and to said tracker, said communication peers containing pieces of information,
wherein a first of said communication peers is a requesting client on an access network of a first Internet Service Provider,
wherein the tracker includes a database of said communication peers and information possessed by said communication peers,
wherein said requesting client sends a query regarding a specific piece of information to said tracker, wherein said tracker consists of a retrieval module, a peer selection module and a service selection module, wherein the peer selection module calculates the peers that best serve future requests based on metrics and the service selection module receives topological location information of said requesting client and determines which service that said client is allowed to access,
wherein said tracker, upon receiving the query, answers the query by extracting the topological location information using said retrieval module and storing the topological location information in the database for a configurable length of time, and by providing said requesting client a list that includes a subset of all said communication peers possessing said requested piece of information, wherein said tracker deletes the topological location information based on a frequency of changes in a number of or structure of the participating communication peers; and
a network entity connected on said access network downstream of said requesting client, the network entity receiving a message of said requesting client directed to said tracker, said message having a location field with a content, and said network entity i) detecting whether the content of the location field of said message is marked as one of the group consisting of empty or invalid, and upon detecting that the location field is marked as empty or invalid, the network entity stamps said message by overwriting the content of said location field with valid topological location information of said requesting client, and ii) forwarding said message, with the stamped valid topological location information, to said tracker, wherein said valid topological location information includes at least one of an identification of the requesting client's Internet Service Provider, the requesting client's Autonomous System Number, the requesting client's main distribution frame ID, the requesting client's Digital Subscriber Line Access Multiplexer/Multi-Service Access Node, and x,y-coordinates of the requesting client within an area and the requesting client's line ID.

18. The system according to claim 17, wherein said network entity is operated by said requesting client's Internet Service Provider.

19. The system according to claim 17, wherein said network entity is a first IP-aware device located downstream of said requesting entity in said access network of the first Internet Service Provider.

20. The system according to claim 17, wherein said network entity is one of the group consisting of an MSAN (Multi-Service Access Node), a BRAS (Broadband Remote Access Server), a router and an L2/L3 access node.

21. The system according to claim 17, wherein said tracker includes a location information retrieval module that is configured to extract, upon receiving said message stamped with topological location information of said requesting client, the topological location information from said message.

22. The system according to claim 17, wherein said peer selection module is configured to determine a first subset of participating communication peers that are topologically located closest to said requesting client.

23. The system according to claim 17, wherein said service selection module is configured to determine, based on the topological location information extracted from said message, services that said requesting client is allowed to access.

24. A method for supporting a selection of communication peers in an overlay network, the method including:

operating a first communication peer, of a plurality of communication peers participating in said overlay network and possessing certain pieces of information, as a requesting client having a topological location being on an access network of a first Internet Service Provider; and operating a peer-to-peer server as a peer-to-peer tracker maintaining a database of said communication peers having specific pieces of information, wherein said peer to peer tracker consists of a retrieval module, a peer selection module and a service selection module wherein the peer selection module calculates the peers that best serve future requests based on metrics, and the service selection module receives topological location information of said requesting client and determines which service that said requesting client is allowed to access, said requesting client sending a location update message to said tracker via an IP-aware network entity on the access network of the first Internet Service Provider, said message instructing the first Internet Service Provider to disclose the topological location of the requesting client to the tracker, said message including a location field with a content, the network entity receiving said message of said requesting client directed to said tracker, said network entity i) detecting whether the content of the location field of said message is marked as one of the group consisting of empty or invalid, and upon detecting that the location field is marked as the one of empty or invalid, the network entity stamping said message by overwriting the content of said location field with valid topological location information of said requesting client, and ii) forwarding said message, with the stamped valid topological location information, to said tracker, wherein said valid topological location information includes at least one of an identification of the requesting client's Internet Service Provider, the requesting client's Autonomous System Number, the requesting client's main distribution frame ID, the requesting client's Digital Subscriber Line Access Multiplexer/Multi-Service Access Node, and x,y-coordinates of the requesting client within an area and the requesting client's line ID, said tracker extracting from said location field said stamped valid topological location information and storing said stamped valid topological location information for said requesting client in said database, said requesting client sending a query regarding a specific piece of information to said tracker, and said tracker, upon receiving said query, answering said query by extracting the topological location information using retrieval module and storing the topological location information in the database for a configurable length of time, and by providing said requesting client a list of a first subset of said communication peers possessing said requested piece of information, wherein said tracker deletes the topological location information based on the frequency of changes in the number or structure of the participating communication peers, wherein, said tracker uses the stamped valid topological location information, extracted from said message from said requesting client, in making the list of the first subset of said communication peers based on a topological relationship between said requesting client and said communication peers.

\* \* \* \* \*